(12) United States Patent
Eitelhuber et al.

(10) Patent No.: US 11,757,403 B2
(45) Date of Patent: Sep. 12, 2023

(54) TELESCOPIC GUIDE ASSEMBLY FOR BRIDGING SOLAR PANEL TABLES IN A SOLAR ARRAY

(71) Applicant: NOMADD DESERT SOLAR SOLUTIONS PTE. LTD., Singapore (SG)

(72) Inventors: Georg Robert Eitelhuber, Thuwal (SA); Abdul Rahim Abdul Jaleel, Thuwal (SA)

(73) Assignee: NOMADD DESERT SOLAR SOLUTIONS PTE. LTD.

( * ) Notice: Subject to any disclaimer, the term of this patent is extended or adjusted under 35 U.S.C. 154(b) by 218 days.

(21) Appl. No.: 17/084,630

(22) Filed: Oct. 30, 2020

(65) Prior Publication Data

US 2022/0140776 A1    May 5, 2022

(51) Int. Cl.
*H02S 30/10*        (2014.01)
*H02S 40/10*        (2014.01)

(52) U.S. Cl.
CPC .............. *H02S 30/10* (2014.12); *H02S 40/10* (2014.12)

(58) Field of Classification Search
CPC ................................. H02S 30/10; H02S 40/10
See application file for complete search history.

(56) References Cited

U.S. PATENT DOCUMENTS 9,676,501 B1 *   6/2017   Spence ................. B64G 1/443

FOREIGN PATENT DOCUMENTS

JP          2020145873        *   9/2020

* cited by examiner

*Primary Examiner* — Jayne L Mershon

(57) ABSTRACT

A telescopic guide assembly for bridging a first solar panel table and a second solar panel table is disclosed. The telescopic guide assembly may include an inner pipe partially disposed within an outer pipe. The inner pipe may be configured to rotate within the outer pipe and may be further configured to partially slide-in or slide-out of the outer pipe. The telescopic guide assembly may further include a first coupler configured to mechanically couple the inner pipe with the first solar panel table at an associated first position on an inner side of the first solar panel table facing a second solar panel table, and a second coupler configured to mechanically couple the outer pipe with the second solar panel table at an associated second position on an inner side of the second solar panel table facing the first solar panel table.

11 Claims, 9 Drawing Sheets

TELESCOPIC GUIDE ASSEMBLY FOR BRIDGING SOLAR PANEL TABLES IN A SOLAR ARRAY

TECHNICAL FIELD

This disclosure relates generally to a solar array comprising solar panel tables, and particularly to a telescopic guide assembly for bridging adjacent solar panel tables in the solar array.

BACKGROUND

There has lately been a steep rise in the adoption of the solar-based technology as an alternative to energy production technologies. This has led to installation of solar panels in a wide variety of settings. For example, a set of solar panels are typically arranged in a plane to form a solar panel table that may be installed on a rooftop or a large open area. Further, for example, a solar array may include a large number of solar panel tables that are distributed over a large geographical area. However, such large area often has many topographical differences. The solar panel tables may be mounted on support understructures (e.g., fixed-tilt, or trackers types) that are fixed on the ground and that follow the ground contours. Although, it may be possible to step the contours using grading to reduce contour angles, however, this proves to be expensive.

Further, the solar panel tables are usually set up in long series lines, that may comprise of many solar panel tables in one long line. Due to panel length limitations and topographical differences, central axes of adjacent solar panel tables are often misaligned. The misalignment can occur in several different degrees of freedom between adjacent tables. For example, the misalignment may include a vertical and a laterally horizontal misalignment of longitudinal axes (seen end on). This may be caused when the end support poles of adjacent trackers do not line up, and may be up to 300 millimeters vertically, and as much as 50 meters horizontally (laterally). Further, the misalignment may include misalignment due to topography angle (longitudinal axis) misalignment (seen side on). This misalignment may be up to 15 degrees. Furthermore, the misalignment may include tracker angle misalignment (seen end-on) which may be caused by internal torsional effects between the actuator and the ends of the panel. The actuator sensed angle may also have larger tolerances of a few degrees. The net effect may be up to 5 degrees tracker angle misalignment between adjacent solar panel tables.

It may be appreciated that the tracker system is a dynamic system, where the tracker angle changes over the day from up to +60 to −60 degrees of motion around the main axis, as it follows the sun. However, due to one or more of the above misalignments, complex compound angles may result between the panel planes (i.e., planes of solar panel tables). As a result, the panel frame outer edges at the top and bottom of adjacent solar panel tables may constantly change their relative distances from each other.

The solar panels require regular cleaning, for example to remove dust, for efficient working of the solar panels. As such, the solar panels may be cleaned by robotic device using brush assemblies. The cleaning may ideally occur in the early or late hours, when the tracker angle is large, to avoid humidity condensate. The cleaning may also occur at night, so as to avoid wind loading and vibrational effects from eddy currents, and panels are "stowed" at an angle between 5 and 25 degrees.

For robotic cleaning to be effective, multiple panels should be automatically cleaned with a single dedicated robotic device. This could be achieved very effectively, provided the robotic device can navigate between adjacent solar panel tables effectively, for the maximum possible range of misalignments. However, due to the compound misalignment, this becomes hard to achieve.

In order to remove the compound angles, some techniques include performing cleaning only at zero tracker angle, by using one robotic device per tracker. However, this leads to requirement of a larger number of robotic devices, and therefore, higher cost. Some other techniques may use pinned and sliding bridges to create a smooth transition between panels. However, this results in a highly complex bridge design that requires a high amount of material and custom components, thereby increasing the cost.

Therefore, a simple, low cost, and effective means of bridging the tracker tables (in other words, solar panels) is desired that allows seamless movement of the robotic device between the solar panels.

SUMMARY

In an embodiment, a solar array is disclosed. The solar array may include a first solar panel table comprising a first set of solar panels and defining a first plane. The solar array may further include a second solar panel table comprising a second set of solar panels and defining a second plane. Further, the solar array may include at least one telescopic guide assembly bridging the first solar panel table and the second solar panel table to allow a seamless movement of a robotic device between the first solar panel table and the second solar panel table. The at least one telescopic guide assembly may run from an associated first position on an inner side of the first solar panel table facing the second solar panel table to an associated second position on an inner side of the second solar panel table facing the first solar panel table. The at least one guide assembly may include an inner pipe partially disposed within an outer pipe. The inner pipe may be configured to rotate within the outer pipe and may be further configured to partially slide-in or slide-out of the outer pipe. The at least one guide assembly may further include a first coupler configured to mechanically couple the inner pipe with the first solar panel table at the associated first position, and a second coupler configured to mechanically couple the outer pipe with the second solar panel table at the associated second position.

In an embodiment, a telescopic guide assembly for bridging solar panel tables is disclosed. The telescopic guide assembly may include an inner pipe partially disposed within an outer pipe. The inner pipe may be configured to rotate within the outer pipe and may be further configured to partially slide-in or slide-out of the outer pipe. The telescopic guide assembly may further include a first coupler configured to mechanically couple the inner pipe with a first solar panel table at an associated first position. The first solar panel table may include a first set of solar panels and defining a first plane. The telescopic guide assembly may further include a second coupler configured to mechanically couple the inner pipe with a second solar panel table at an associated second position. The second solar panel table may include a second set of solar panels and defining a second plane. The telescopic guide assembly may run from the associated first position on an inner side of the first solar panel table facing the second solar panel table to the associated second position on an inner side of the second solar panel table facing the first solar panel table. Further, the telescopic guide assembly may be configured to bridge the first solar panel table and the second solar panel table to allow a seamless movement of a robotic device between the first solar panel table and the second solar panel table.

The accompanying drawings, which are incorporated in and constitute a part of this disclosure, illustrate exemplary embodiments and, together with the description, serve to explain the disclosed principles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
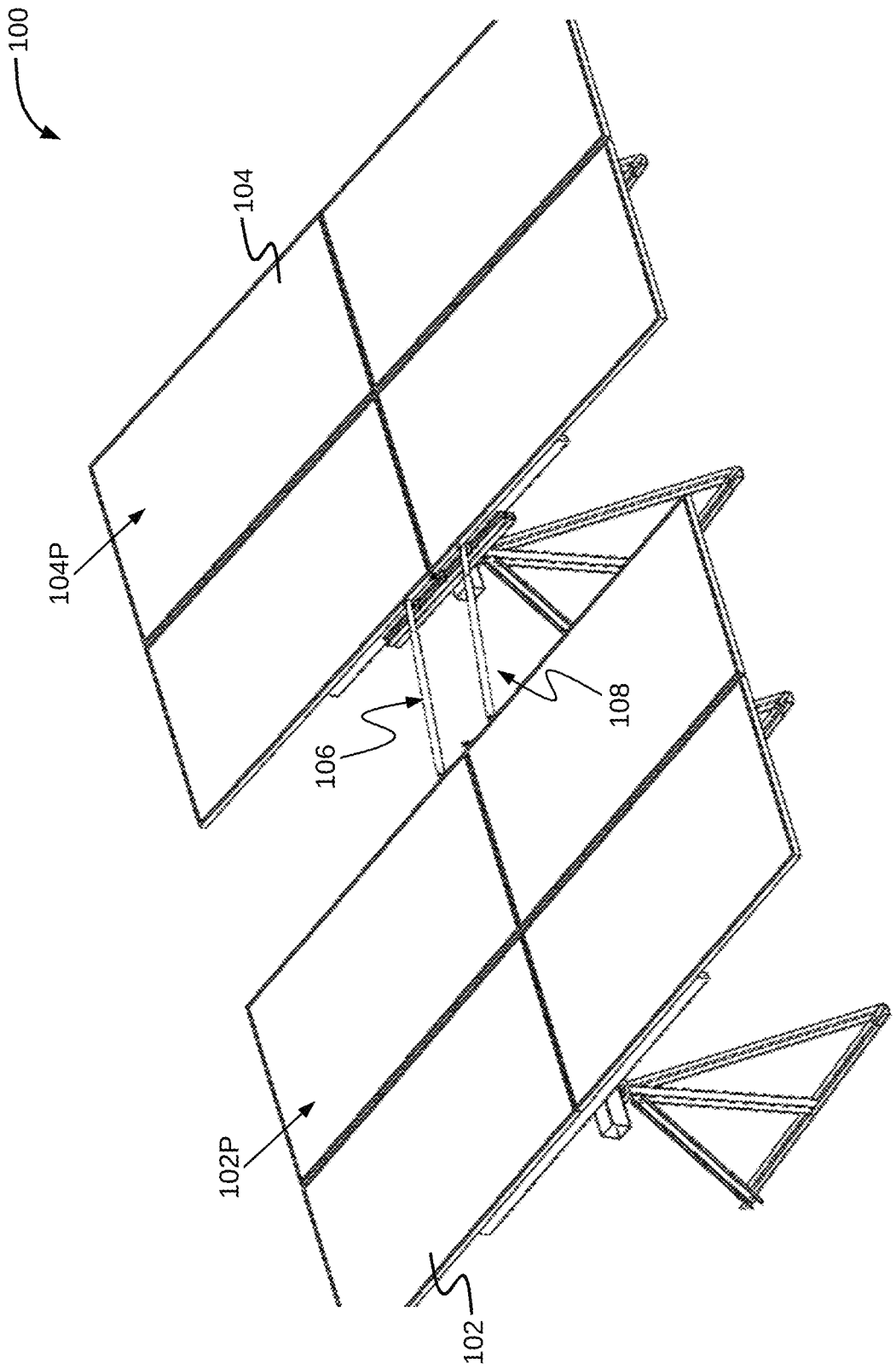
FIG. 1A illustrates a perspective view of a solar array, in accordance with an embodiment of the present disclosure.

Referring now to FIG. 1A, a perspective view of a solar array 100 is illustrated, in accordance with an embodiment of the present disclosure. By way of an example, the solar array 100 may include a number of solar panel tables including a first solar panel table 102 and a second solar panel table 104. It should be noted that the first solar panel table 102 is adjacent to the second solar panel table 104. Each of the solar panel tables may include a set of solar panels defining a two-dimensional (2D) plane. Thus, the first solar panel table 102 may include a first set of solar panels defining a first plane 102P of the first solar panel table 102. Similarly, the second solar panel table 104 may include a second set of solar panels defining a second plane 104P of the second solar panel table 104.

In some embodiments, each of the solar panel tables may be configured to rotate about one or more axes. For example, each of the first solar panel table 102 and the second solar panel table 104 may be configured to rotate about one or more corresponding axes. Further, it may be noted that the rotation of each of the first solar panel table 102 and the second solar panel table 104 may be mutually independent of each other. Such mutually independent rotation of solar panel tables about their respective axes may result in complex lateral and angular misalignment between the adjacent solar panel tables, such as, the first solar panel table 102 and the second solar panel table 104.

The solar array 100 may further include one or more telescopic guide assembly bridging any two adjacent solar panel tables. Such bridge may allow a seamless movement of a robotic device (e.g., cleaning robots) between the two adjacent solar panel tables. For example, the solar array may include a first telescopic guide assembly 106 configured to bridge the first solar panel table 102 and the second solar panel table 104 to allow a seamless movement of a robotic device (not shown in FIG. 1A) between the first solar panel table 102 and the second solar panel table 104. As such, the first telescopic guide assembly 106 may be configured to support the weight and motion of the robotic device.

As shown in FIG. 1A, the first telescopic guide assembly 106 may run from an associated first position on an inner side of the first solar panel table 102 facing the second solar panel table 104 to an associated second position on an inner side of the second solar panel table 104 facing the first solar panel table 102. It may be noted that each of the associated first position and the associated second position may be at a pre-determined distance and in a pre-determined direction from a centre of the inner side of each of the first solar panel table 102 and the second solar panel table 104, respectively. This is further explained in conjunction with FIG. 1C.

In some embodiments, the first telescopic guide assembly 106 may be mounted on top of the first solar panel table 102 and the second solar panel table 104. In alternate embodiments, the first telescopic guide assembly 106 may be in flush with the first solar panel table 102 and the second solar panel table 104.

In some embodiments, the first telescopic guide assembly 106 may be configured to be retrofitted between the first solar panel table 102 and the second solar panel table 104.

In some embodiments, the solar array 100 may further include a second telescopic guide assembly 108. Similar to the first telescopic guide assembly 106, the second telescopic guide assembly 108 may be configured to bridge the first solar panel table 102 and the second solar panel table 104 to allow a seamless movement of a robotic device between the first solar panel table 102 and the second solar panel table 104. Further, the second telescopic guide assembly 108 may run from an associated first position on an inner side of the first solar panel table 102 facing the second solar panel table 104 to an associated second position on an inner side of the second solar panel table 104 facing the first solar panel table 102. Each of the associated first position and the associated second position may be at a pre-determined distance and in a pre-determined direction from a centre of the inner side of each of the first solar panel table 102 and the second solar panel table 104, respectively.

In some embodiments, the second telescopic guide assembly 108 may be mounted on top of the first solar panel table 102 and the second solar panel table 104. In alternate embodiments, the second telescopic guide assembly 108 may be in flush with the solar panel table 102 and the second solar panel table 104. Further, the second telescopic guide assembly 108 may be configured to be retrofitted between the first solar panel table 102 and the second solar panel table 104. The first telescopic guide assembly 106 and the second telescopic guide assembly 108 are further explained in detail, in conjunction with FIG. 1B.

Figure 1B:
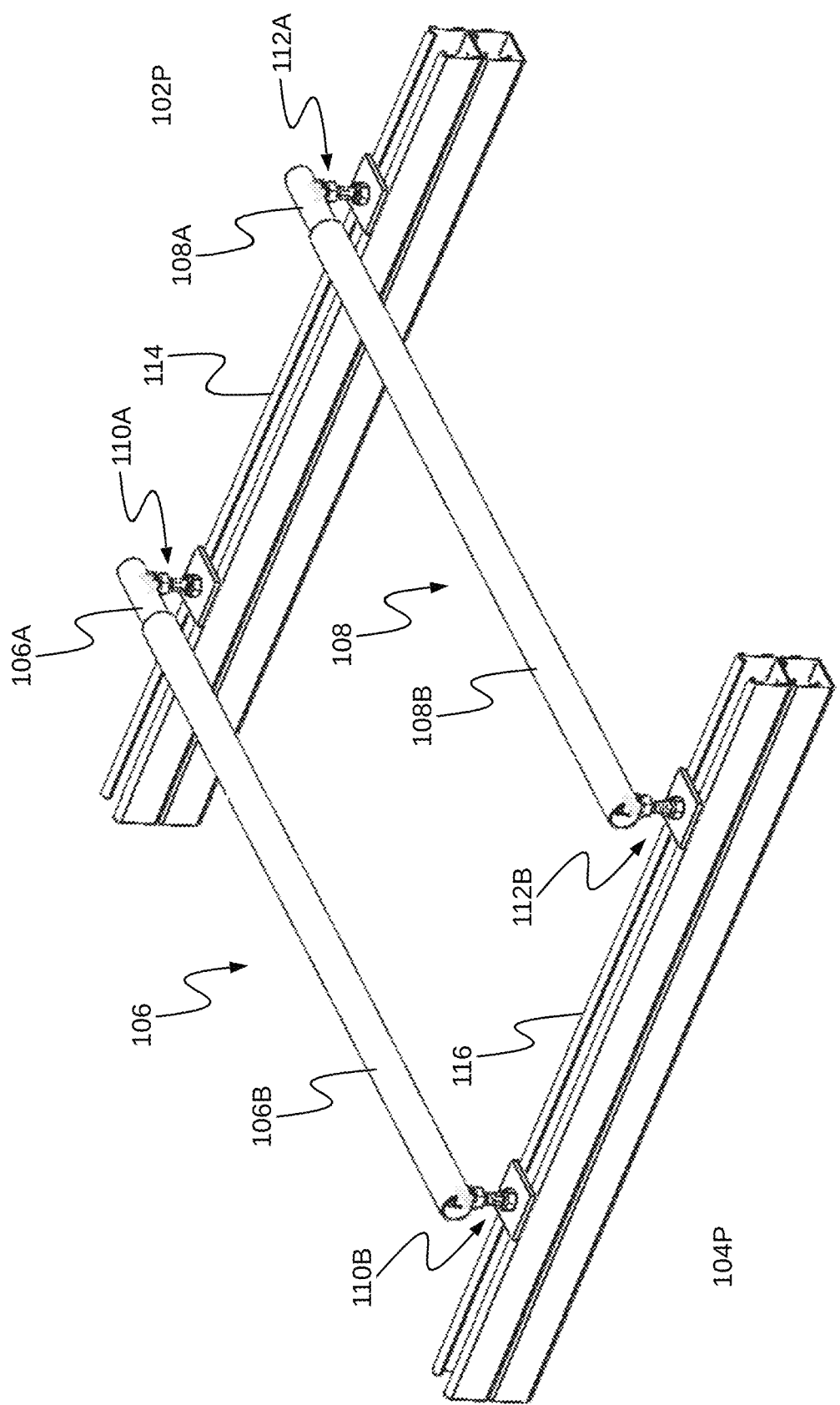
FIG. 1B illustrates a magnified perspective view of the solar array, in accordance with an embodiment of the present disclosure.

Referring now to FIG. 1B, a magnified perspective view of the solar array 100 (particularly showing the first telescopic guide assembly 106 and the second telescopic guide assembly 108) is illustrated, in accordance with an embodiment.

In some embodiments, the first telescopic guide assembly 106 may include an inner pipe 106A partially disposed within an outer pipe 106B. The inner pipe 106A may be configured to rotate within the outer pipe 106B. Further, the inner pipe 106A may be configured to partially slide-in or slide-out of the outer pipe 106B. The first telescopic guide assembly 106 may further include a first coupler 110A configured to mechanically couple the inner pipe 106A with the first solar panel table 102 at the associated first position. The first telescopic guide assembly 106 may further include a second coupler 110B configured to mechanically couple the outer pipe 106B with the second solar panel table 104 at the associated second position.

Similarly, the second telescopic guide assembly 108 may include an inner pipe 108A partially disposed within an outer pipe 108B. The inner pipe 108A may be configured to rotate within the outer pipe 108B. Further, the inner pipe 108A may be configured to partially slide-in or slide-out of the outer pipe 108B. The second telescopic guide assembly 108 may further include a first coupler 112A configured to mechanically couple the inner pipe 108A with the first solar panel table 102 at the associated first position. The second telescopic guide assembly 108 may further include a second coupler 1128 configured to mechanically couple the outer pipe 1088 with the second solar panel table 104 at the associated second position.

In some embodiments, each of the first coupler 110A, the second coupler 110B, the first coupler 112A, and the second coupler 1128 (hereinafter, collectively referred to as "couplers") may include a flexible joint configured to mechanically couple each of the respective inner pipe and the outer pipe, respectively, with a bracket 114 or bracket 116 mechanically attached to the solar panel table 102 and the second solar panel table 104, respectively.

For example, the first coupler 110A may include a flexible joint configured to mechanically couple the inner pipe 106A with a bracket 114 mechanically attached to the first solar panel table 102. Similarly, the second coupler 110B may include a flexible joint configured to mechanically couple the outer pipe 106B with a bracket 116 mechanically attached to the second solar panel table 104. It may be noted that the flexible joint may be configured to allow relative motion in any rational axes between respective pipe and respective bracket. Further, the flexible joint may be one of a padded pivot pin, a ball joint, and a helm joint, or any other type of joint known in the art. It should be noted that the padding in the padded pivot pin may be by way of rubber insert between the bracket and the respective pipe.

Figure 1C:
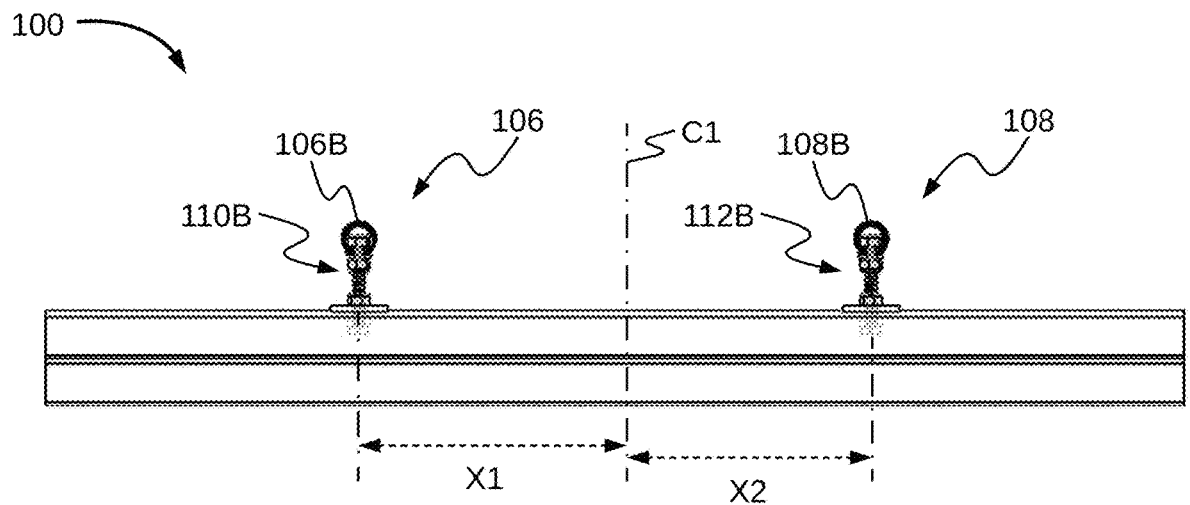
FIG. 1C illustrates a side view of the solar array, in accordance with an embodiment of the present disclosure.

Referring now to FIG. 1C, a side view of the solar array 100 (particularly showing the first telescopic guide assembly 106 and the second telescopic guide assembly 108) is illustrated, in accordance with an embodiment. As shown in the FIG. 1C, the first telescopic guide assembly 106 may include the inner pipe 106A (not shown in the FIG. 1C) partially disposed within the outer pipe 106B. The first telescopic guide assembly 106 further includes the second coupler 110A (not shown in the FIG. 1C) configured to mechanically couple the inner pipe 106A with the first solar panel table 102 at the associated first position. The first telescopic guide assembly 106 further includes the second coupler 110B configured to mechanically couple the outer pipe 106B with the second solar panel table 104 at the associated second position.

Similarly, the second telescopic guide assembly 108 includes the inner pipe 108A (not shown in the FIG. 1C) partially disposed within the outer pipe 108B and the first coupler 112A configured to mechanically couple the inner pipe 108A (not shown in the FIG. 1C) with the first solar panel table 102 at the associated first position. The second telescopic guide assembly 108 further includes the second coupler 1128 configured to mechanically couple the outer pipe 108B with the second solar panel table 104 at the associated second position.

As mentioned above, the associated first position associated with the first telescopic guide assembly 106 may be at a pre-determined distance and in a pre-determined direction from a centre of the inner side of the first solar panel table 102 and the second solar panel table 104. As shown in the FIG. 1C, the associated second position associated with the first telescopic guide assembly 106 may be at a pre-determined distance "X1" towards the left (pre-determined direction) from an imaginary line C1 passing through the centre of the inner side of the first solar panel table 102.

Similarly, the associated second position associated with the second telescopic guide assembly 108 may be at a pre-determined distance "X2" towards the right (pre-determined direction) from the imaginary line C1 passing through the centre of the inner side of the first solar panel table 102. As such, for example, the distance X1 may be equal to the distance X2.

In some embodiments, the first telescopic guide assembly 106 and the second telescopic guide assembly 108 may be positioned such that each of the two telescopic guide assemblies 106, 108 is equidistant from the centre (i.e., X1=X2). In other words, the first telescopic guide assembly 106 and the second telescopic guide assembly 108 may be positioned at an equal pre-determined distance, but in opposite pre-determined directions from the centre. Such positioning of the telescopic guide assemblies 106, 108 increases the stability of the robotic device moving on the bridge.

Further, in some embodiments, the first telescopic guide assembly 106 and the second telescopic guide assembly 108 may be positioned closer to centre rather than farther from the centre. Such positioning of the telescopic guide assemblies 106, 108 is advantageous to the operation of the of the two telescopic guide assemblies 106, 108. In particular, such positioning may reduce the impact of lateral misalignment between the first solar panel table 102 and the second solar panel table 104.

Figure 1D:
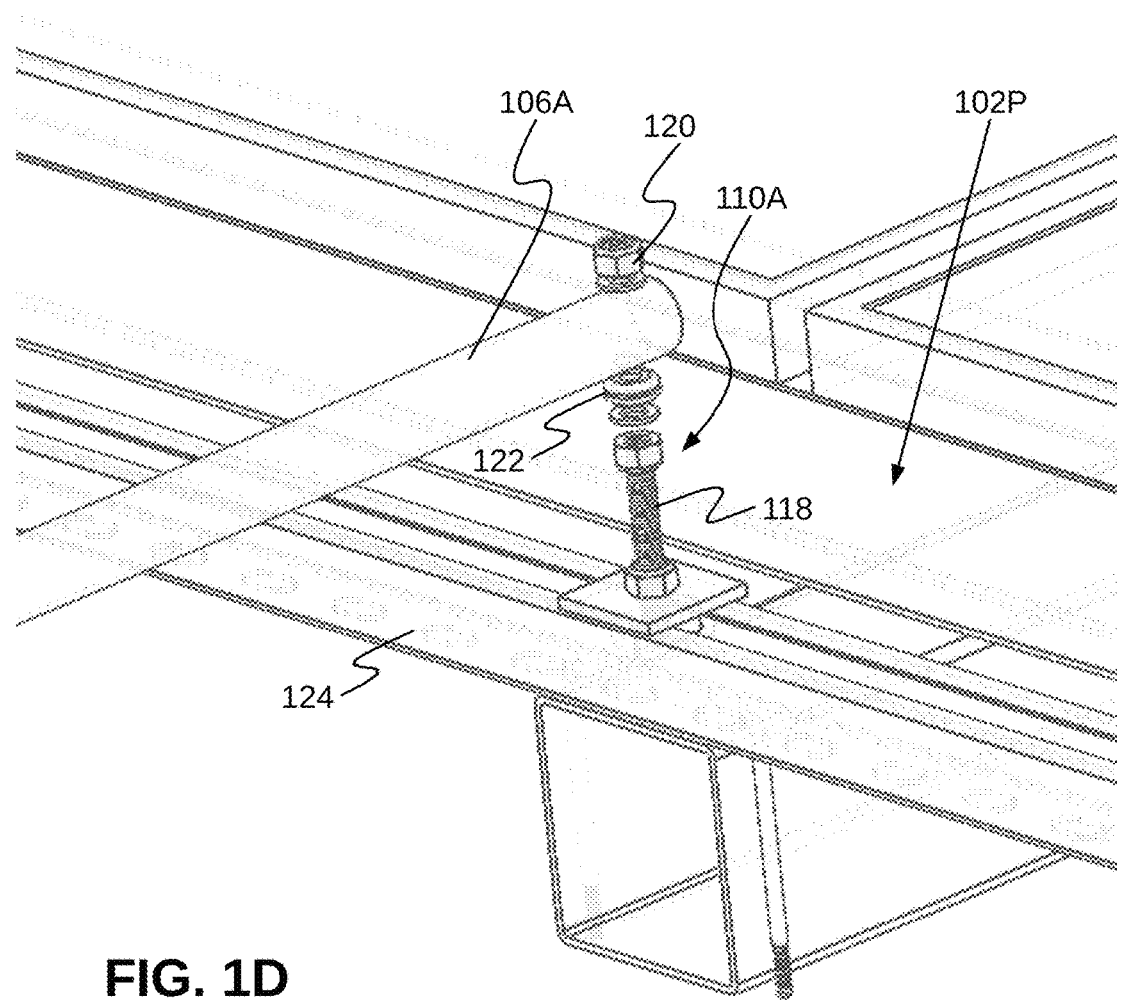
FIG. 1D illustrates a magnified perspective view of the solar array, in accordance with an embodiment of the present disclosure.

Referring now to FIG. 1D, a magnified perspective view of the solar array 100 (particularly showing an unassembled first coupler 110A) is illustrated, in accordance with an embodiment. As mentioned above, the first coupler 110A may be configured to mechanically couple the inner pipe 106A with the first solar panel table 102 at the associated first position.

In some embodiments, each of the couplers may include a bottom fastener, a top fastener, and a flexible member. For example, as shown in the FIG. 1D, the first coupler 110A may include a bottom fastener 118, a top fastener 120, and a flexible member 122. For example, the bottom fastener 118 may be a bolt and the top fastener 120 may be a nut configured to be tightened to the bolt. Further, the flexible member 122 may be a grommet made of a flexible material like rubber. In order to mechanically couple the inner pipe 106A with the first solar panel table 102, the bottom fastener 118 may be fastened to a bracket 124 (corresponding to the bracket 114 or the bracket 116) which may be mechanically attached to the first solar panel table 102. The inner pipe 106A may be coupled to the first solar panel table 102 using the bottom fastener 118 and the top fastener 120, through the flexible member 122. As it will be understood that the mechanical coupling via the bottom fastener 118 and the top fastener 120 may allow the inner pipe 106A to swivel about the bottom fastener 118 in a two-dimensional plane, while the flexible member allows the inner pipe 106A a movement in the three-dimensional space. This allows the inner pipe 106A, and, therefore, the first telescopic guide assembly 106, a flexibility of motion in three-dimensional space and assume complex three-dimensional angles with respect to the first solar panel table 102. It may be further understood that the remaining couplers may have the same construction and structure as of the first coupler 110A.

Figure 2A:
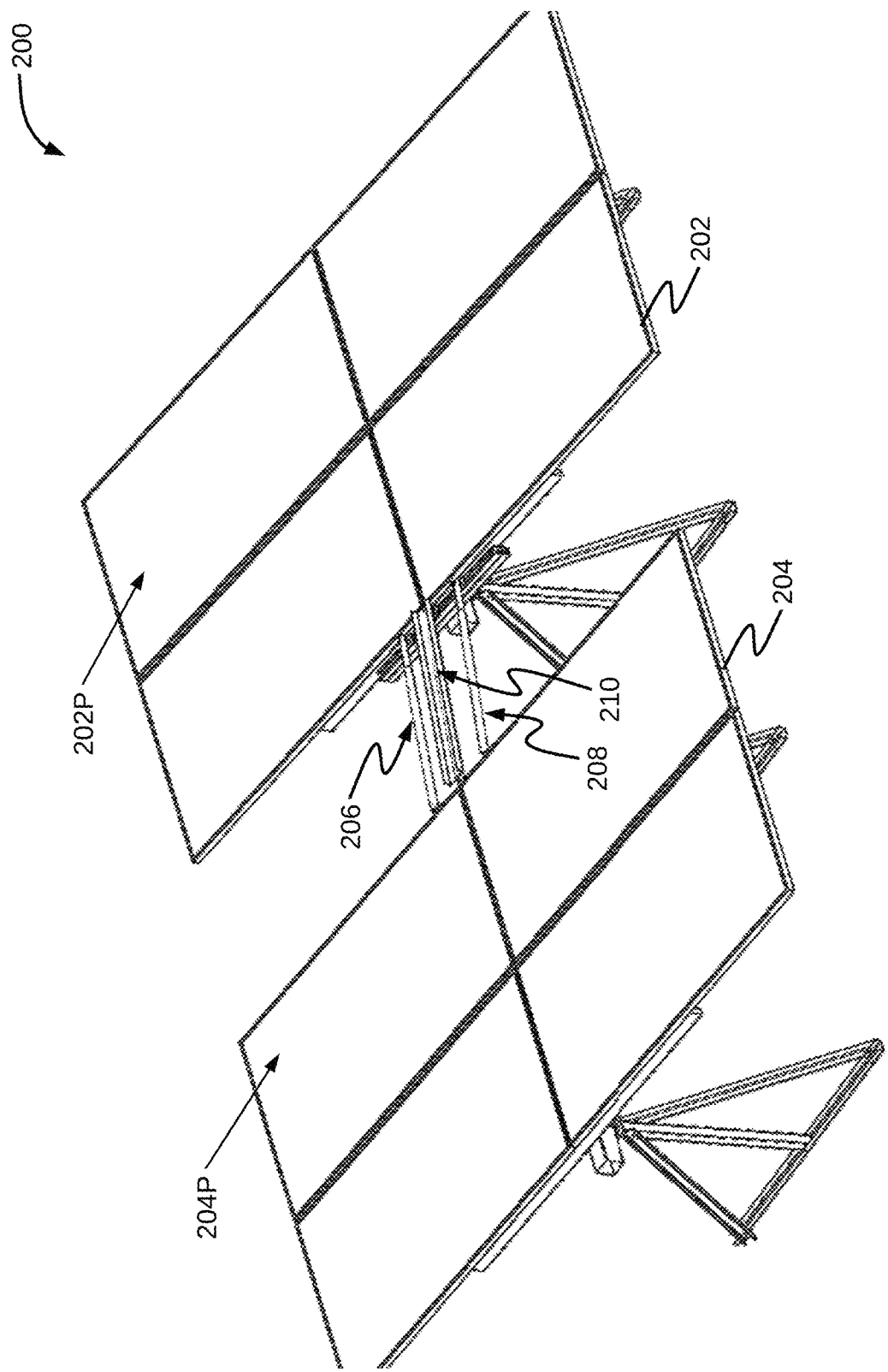
FIG. 2A illustrates a perspective view of a solar array, in accordance with another embodiment of the present disclosure.

Referring now to FIG. 2A, a perspective view of a solar array 200 is illustrated, in accordance with another embodiment of the present disclosure. The solar array 200 may include a first solar panel table 202 and a second solar panel table 204. The first solar panel table 202 may include a first set of solar panels and defining a first plane. Similarly, the second solar panel table 204 may include a second set of solar panels and defining a second plane.

The solar array 200 may further include a first telescopic guide assembly 206. The first telescopic guide assembly 206 may be configured to bridge the first solar panel table 202 and the second solar panel table 204 to allow a seamless movement of a robotic device between the first solar panel table 202 and the second solar panel table 204. As such, the first telescopic guide assembly 206 may be configured to support the weight and motion of the robotic device. Further, the first telescopic guide assembly 206 may run from an associated first position on an inner side of the first solar panel table 202 facing the second solar panel table 204 to an associated second position on an inner side of the second solar panel table 204 facing the first solar panel table 202. Each of the associated first position and the associated second position may be at a pre-determined distance and in a pre-determined direction from a centre of the inner side of each of the first solar panel table 202 and the second solar panel table 204, respectively. It may be noted that the pre-determined distance may be ideally kept as short (i.e., as close to the centre) as possible so as to ensure minimum misalignment and, therefore, increased stability of the robotic device The solar array 200 may further include a second telescopic guide assembly 208 configured to bridge the first solar panel table 202 and the second solar panel table 204 to allow a seamless movement of a robotic device between the first solar panel table 202 and the second solar panel table 204. Further, the second telescopic guide assembly 208 may run from an associated first position on an inner side of the first solar panel table 202 facing the second solar panel table 204 to an associated second position on an inner side of the second solar panel table 204 facing the first solar panel table 202. Each of the associated first position and the associated second position may be at a pre-determined distance and in a pre-determined direction from a centre of the inner side of each of the first solar panel table 202 and the second solar panel table 204, respectively.

As shown in FIG. 2A, in some embodiments, the solar array 200 may further include a third telescopic guide assembly 218 that may be configured to further bridge the first solar panel table 202 and the second solar panel table 202. Further, the third telescopic guide assembly 218 may run from a first associated position on the inner side of the first solar panel table 202 facing the second solar panel table 204 to an associated second position on an inner side of the second solar panel table 2024 facing the first solar panel table 202. For example, the associated first position of the third telescopic guide assembly 218 may be a middle point between the first position associated with first telescopic guide assembly 206 and the first position associated with the second telescopic guide assembly 208 on the inner side of the first solar panel table 202. Similarly, the associated second position of the third telescopic guide assembly 218 may be a middle point between the second position associated with the first telescopic guide assembly 206 and the second position associated with the second telescopic guide assembly 208 on the inner side of the second solar panel table 204.

In some embodiments, the associated first position of the third telescopic guide assembly 218 may be the centre on the inner side of the first solar panel table 202, while the the associated second position of the third telescopic guide assembly 218 may be the centre on the inner side of the second solar panel table 202. In other words, the third telescopic guide assembly 218 may run from the centre on the inner side of the first solar panel table 202 to the centre on the inner side of the second solar panel table 204, and may also be referred to as a central telescopic guide assembly.

Each of the first telescopic guide assembly 206, the second telescopic guide assembly 208, and the third telescopic guide assembly 218 may be mounted on top of the first solar panel table 202 and the second solar panel table 204, or may be in flush with the first solar panel table 202 and the second solar panel table 204. Further, each of the first telescopic guide assembly 206, the second telescopic guide assembly 208, and the third telescopic guide assembly 218 may be configured to be retrofitted between the first solar panel table 202 and the second solar panel table 204.

Figure 2B:
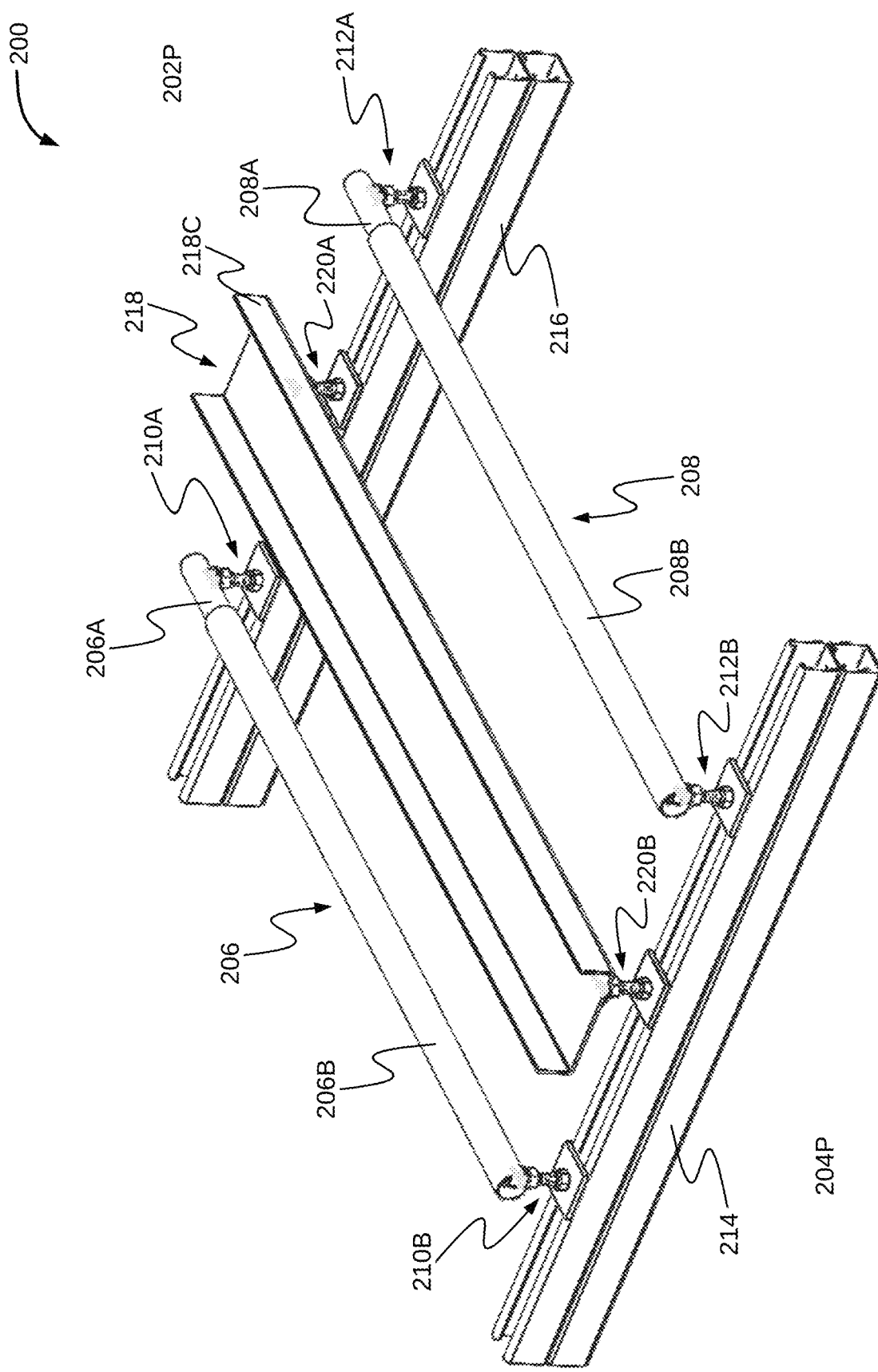
FIG. 2B illustrates a magnified perspective view of the solar array, in accordance with an embodiment of the present disclosure.

Referring now to FIG. 2B, a magnified perspective view of the solar array 200 (particularly showing the first telescopic guide assembly 206, the second telescopic guide assembly 208, and the third telescopic guide assembly 218) is illustrated, in accordance with an embodiment.

In some embodiments, the first telescopic guide assembly 206 may include an inner pipe 206A partially disposed within an outer pipe 206B. The inner pipe 206A may be configured to rotate within the outer pipe 206B. Further, the inner pipe 206A may be configured to partially slide-in or slide-out of the outer pipe 206B. The first telescopic guide assembly 206 may further include a first coupler 210A configured to mechanically couple the inner pipe 206A with the first solar panel table 202 at the associated first position. The first telescopic guide assembly 206 may further include a second coupler 210B configured to mechanically couple the outer pipe 206B with the second solar panel table 204 at the associated second position.

Similarly, the second telescopic guide assembly 208 may include an inner pipe 208A partially disposed within an outer pipe 208B. The inner pipe 208A may be configured to rotate within the outer pipe 208B. Further, the inner pipe 208A may be configured to partially slide-in or slide-out of the outer pipe 208B. The second telescopic guide assembly 208 may further include a first coupler 212A configured to mechanically couple the inner pipe 208A with the first solar panel table 202 at the associated first position. The second telescopic guide assembly 208 may further include a second coupler 212B configured to mechanically couple the outer pipe 208B with the second solar panel table 204 at the associated second position.

Further, the third telescopic guide assembly 218 may include an inner pipe 218A (not shown in FIG. 2B) partially disposed within an outer pipe 218B (not shown in FIG. 2B). The inner pipe 208A may be configured to rotate within the outer pipe 208B, and further configured to partially slide-in or slide-out of the outer pipe 208B. The third telescopic guide assembly 218 may further include a first coupler 220A configured to mechanically couple the inner pipe 218A with the first solar panel table 202 at the associated first position. The third telescopic guide assembly 218 may further include a second coupler 220B configured to mechanically couple the outer pipe 218B with the second solar panel table 204 at the associated second position.

In some embodiments, as shown in FIG. 2B, the third telescopic guide assembly 218 may further include a tray 218C mounted on the outer pipe 218B. The tray 218C may face upwards, in order to receive one or more wheels of the robotic device (not shown in FIG. 2B) as the robotic device travels between the first solar panel table 202 and second solar panel table 204. The one or more wheels of the robotic device may be confined within the side walls of the tray 218, thereby preventing the one or more wheels from sliding sideways off the third telescopic guide assembly 218, and therefore, preventing the robotic device from falling off the third telescopic guide assembly 218.

In some embodiments, each of the first coupler 210A, the second coupler 210B, the first coupler 212A, the second coupler 212B, the first coupler 220A, and the second coupler 220B (hereinafter, collectively referred to as "couplers") may include a flexible joint configured to mechanically couple each of the respective inner pipe and the outer pipe, respectively, with a bracket 214 and bracket 216 mechanically attached to the first solar panel table 202 and the second solar panel table 204, respectively. It may be noted that the flexible joint may be configured to allow relative motion in any rotational axes between respective pipe and respective bracket. Further, the flexible joint may be one of a padded pivot pin, a ball joint, and a helm joint. The flexible joint has already been explained in conjunction with FIG. 1D.

Figure 2C:
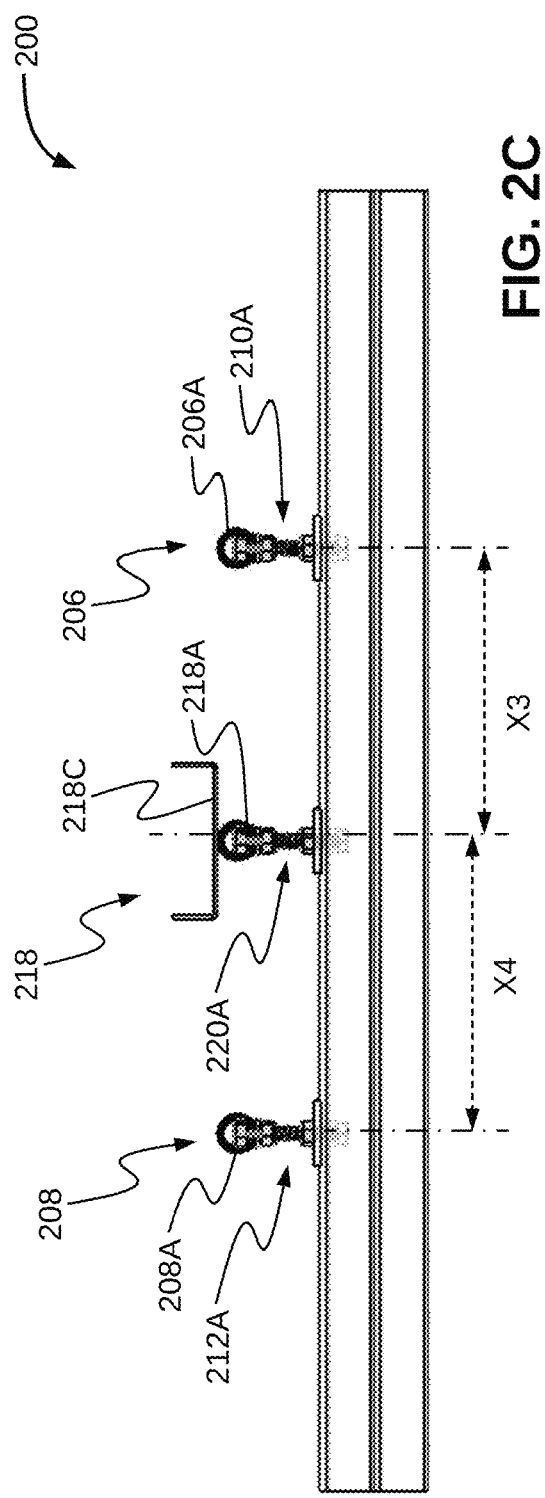
FIG. 2C illustrates a side view of the solar array, in accordance with an embodiment of the present disclosure.

Referring now to FIG. 2C, a side view of the solar array 200 (particularly showing the first telescopic guide assembly 206, the second telescopic guide assembly 208, and the third telescopic guide assembly 218) is illustrated, in accordance with an embodiment. As shown in the FIG. 2C, the first telescopic guide assembly 206 may include an inner pipe 206A partially disposed within an outer pipe 206B (not shown in the FIG. 2C) and the first coupler 210A. The first coupler 210A may be configured to mechanically couple the inner pipe 206A with the first solar panel table 202 at the associated first position. The first telescopic guide assembly 206 may further include a second coupler 210B (not shown in the FIG. 2C) configured to mechanically couple the outer pipe 206B with the second solar panel table 204 at the associated second position.

Similarly, the second telescopic guide assembly 208 may include an inner pipe 208A partially disposed within an outer pipe 208B (not shown in the FIG. 2C). The second telescopic guide assembly 208 may further include the first coupler 212A configured to mechanically couple the inner pipe 208A with the first solar panel table 202 at the associated first position. The second telescopic guide assembly 208 may further include the second coupler 212B (not shown in the FIG. 1C) configured to mechanically couple the outer pipe 208B with the second solar panel table 204 at the associated second position.

Similarly, the third telescopic guide assembly 218 may include an inner pipe 218A partially disposed within an outer pipe 218B (not shown in the FIG. 2C). The third telescopic guide assembly 218 may further include the first coupler 220A configured to mechanically couple the inner pipe 218A with the first solar panel table 202 at the associated first position (i.e., centre). The third telescopic guide assembly 218 may further include the second coupler 220B (not shown in the FIG. 1C) configured to mechanically couple the outer pipe 218B with the second solar panel table 204 at the associated second position. The third telescopic guide assembly 218 may further include the tray 218C mounted on the outer pipe 218B and configured to receive one or more wheels of the robotic device during its seamless movement between the first solar panel table 202 and the second solar panel table 204.

Figure 2D:
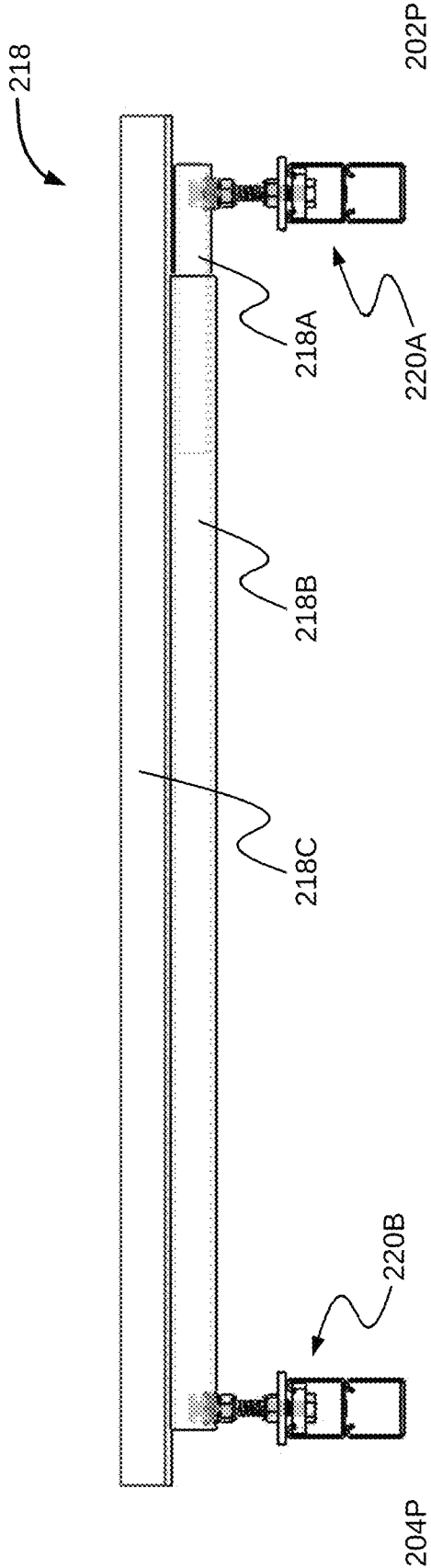
FIG. 2D illustrates a front view of the third telescopic guide assembly, in accordance with an embodiment of the present disclosure.

Additionally, referring to FIG. 2D, a front view of the third telescopic guide assembly 218 is illustrated, in accordance with an embodiment of the present disclosure. The third telescopic guide assembly 218 may include an inner pipe 218A partially disposed within an outer pipe 218B. The third telescopic guide assembly 218 may further include the first coupler 220A configured to mechanically couple the inner pipe 218A with the first solar panel table 202 at the associated first position. The third telescopic guide assembly 218 may further include the second coupler 220B (not shown in the FIG. 2C) configured to mechanically couple the outer pipe 218B with the second solar panel table 204 at the associated second position.

The first position associated with the first telescopic guide assembly 206 may be at a pre-determined distance and in a pre-determined direction from a centre of the inner side of the first solar panel table 202. As shown in the FIG. 2C, the first position associated with the first telescopic guide assembly 206 may be at a pre-determined distance "X3" towards the right (pre-determined direction) from an imaginary line C2 passing through the centre of the inner side of the first solar panel table 202. Similarly, the first position associated with the second telescopic guide assembly 208 may be at a pre-determined distance "X4" towards the left (pre-determined direction) from the imaginary line C2 passing through the centre of the inner side of the first solar panel table 202. As such, for example, X3 may be equal to X4.

As mentioned earlier, the associated first position of the third telescopic guide assembly 218 may be a middle point between the associated first position of the first telescopic guide assembly 206 and the associated first position of the second telescopic guide assembly 208 on the inner side of the first solar panel table 202. Similarly, the associated second position of the third telescopic guide assembly 218 may be a middle point between the associated second position of the first telescopic guide assembly 206 and the associated second position of the second telescopic guide assembly 208 on the inner side of the second solar panel table 204. As such, the associated first position and the associated second position of the third telescopic guide assembly 218 may pass through the imaginary line C2 passing through the centre of the inner side.

Figure 2E:
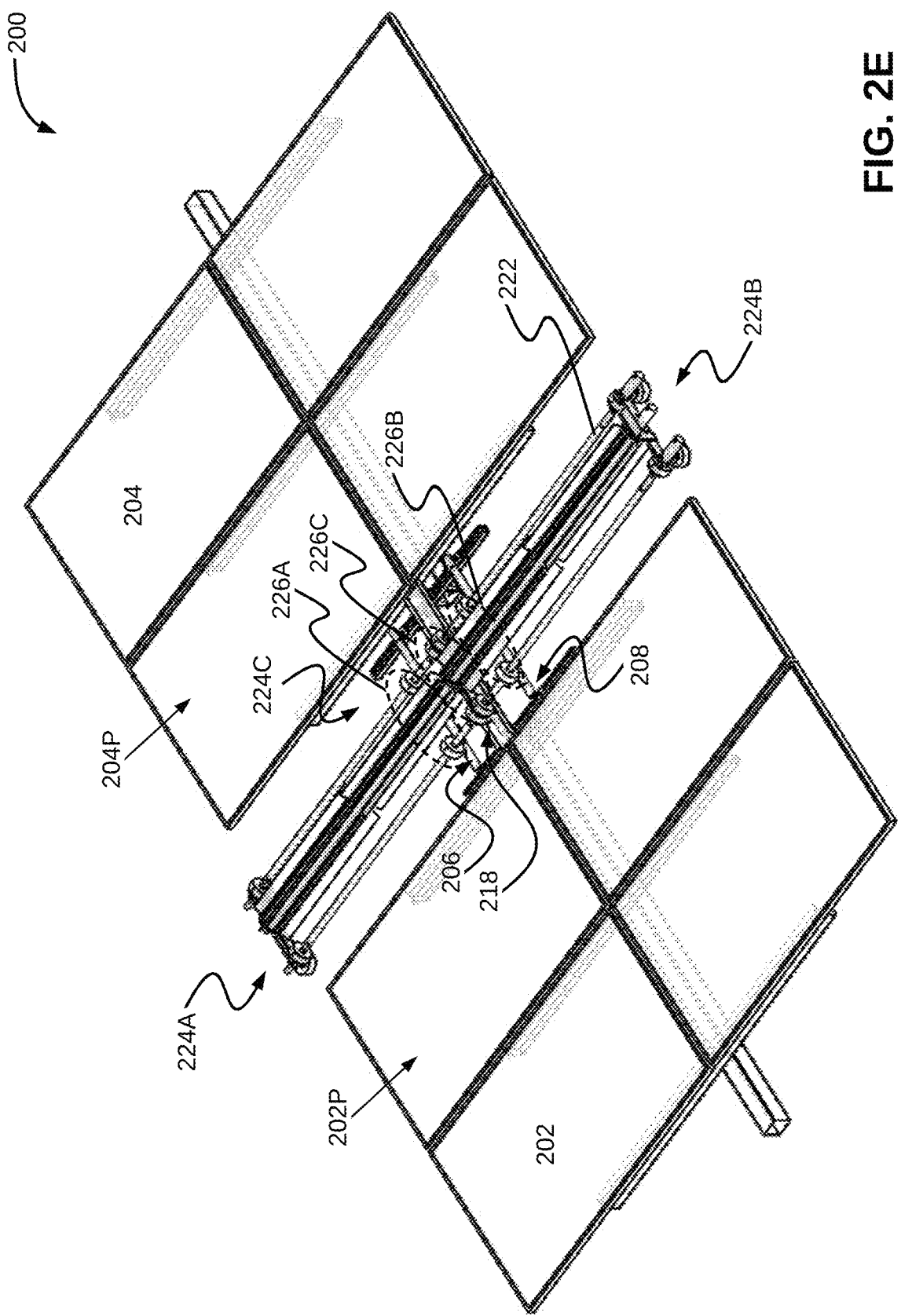
FIG. 2E illustrates a perspective view of the solar array with a robotic device, in accordance with an embodiment of the present disclosure.

Referring now to FIG. 2E, a perspective view of the solar array 200 with a robotic device 222 is illustrated, in accordance with an embodiment. As it can be seen in the FIG. 2E, the solar array 200 includes the first set of solar panels 202 defining the first solar panel table 202 and the second set of solar panels 204 defining the second solar panel table 204.

In order to clean the first solar panel table 202 and the second solar panel table 204, the robotic device 222 may need to move between the first solar panel table 202 and second solar panel table 204. However, the first solar panel table 202 and the second solar panel table 204 may be separated by a distance. Further, each of the first solar panel table 202 and the second solar panel table 204 may be configured to rotate about one or more corresponding axes, and the rotation of each of the first solar panel table 202 and the second solar panel table 204 may mutually independent of each other. As a result of this, the first solar panel table 202 and the second solar panel table 204 may be misaligned.

In order to bridge the first solar panel table 202 and the second solar panel table 204 and to allow a seamless movement of the robotic device 222 between the first solar panel table 202 and the second solar panel table 204, one or more one telescopic guide assemblies may be used. The one more one telescopic guide assemblies may run from an associated first position on an inner side of the first solar panel table 202 facing the second solar panel table 204 to an associated second position on an inner side of the second solar panel table 204 facing the first solar panel table 202. For example, as shown in FIG. 2E, the solar array 200 may include first telescopic guide assembly 206, the second telescopic guide assembly 208, and the third telescopic guide assembly 218.

By way of an example, the robotic device 222 may include a first set of wheels 224A, a second set of wheels 224B, and a third set of wheels 224C. As shown in the FIG. 2E, the first set of wheels 224A and the second set of wheels 224B may engage with the edges of the first solar panel table 202 or the second solar panel table 204, when the robotic device 222 is positioned on the first solar panel table 202 or the second solar panel table 204. As such, when the robotic device 222 is not positioned on the first solar panel table 202 or the second solar panel table 204 (i.e. it is somewhere in between the first solar panel table 202 or the second solar panel table 204), the first set of wheels 224A and the second set of wheels 224B may not be engaging with the edges of the first solar panel table 202 or the second solar panel table 204.

In such position of the robotic device 222, the third set of wheels 224C may engage with the first telescopic guide assembly 206, the second telescopic guide assembly 208, and the third telescopic guide assembly 218. For example, the third set of wheels 224C may include a set of left wheels 226A, a set of right wheels 226B, and a set of center wheels 226C. The set of left wheels 226A may engage with and travel on the first telescopic guide assembly 206. Further, the set of right wheels 226B may engage with and travel on the second telescopic guide assembly 208. Furthermore, the set of center wheels 226C may engage with and travel on the third telescopic guide assembly 218.

The third telescopic guide assembly 218 may include the tray 218C mounted on the outer pipe 218B. As the tray 218C faces upwards, the tray 218C may receive the set of center wheels 226C of the robotic device 222 as the robotic device travels between the first solar panel table 202 and second solar panel table 204. These set of center wheels 226C may be confined within the side walls of the tray 218. This may prevent the one or more wheels from sliding off the third telescopic guide assembly 218, and therefore, prevent the robotic device from falling off the third telescopic guide assembly 218.

Figure 2F:
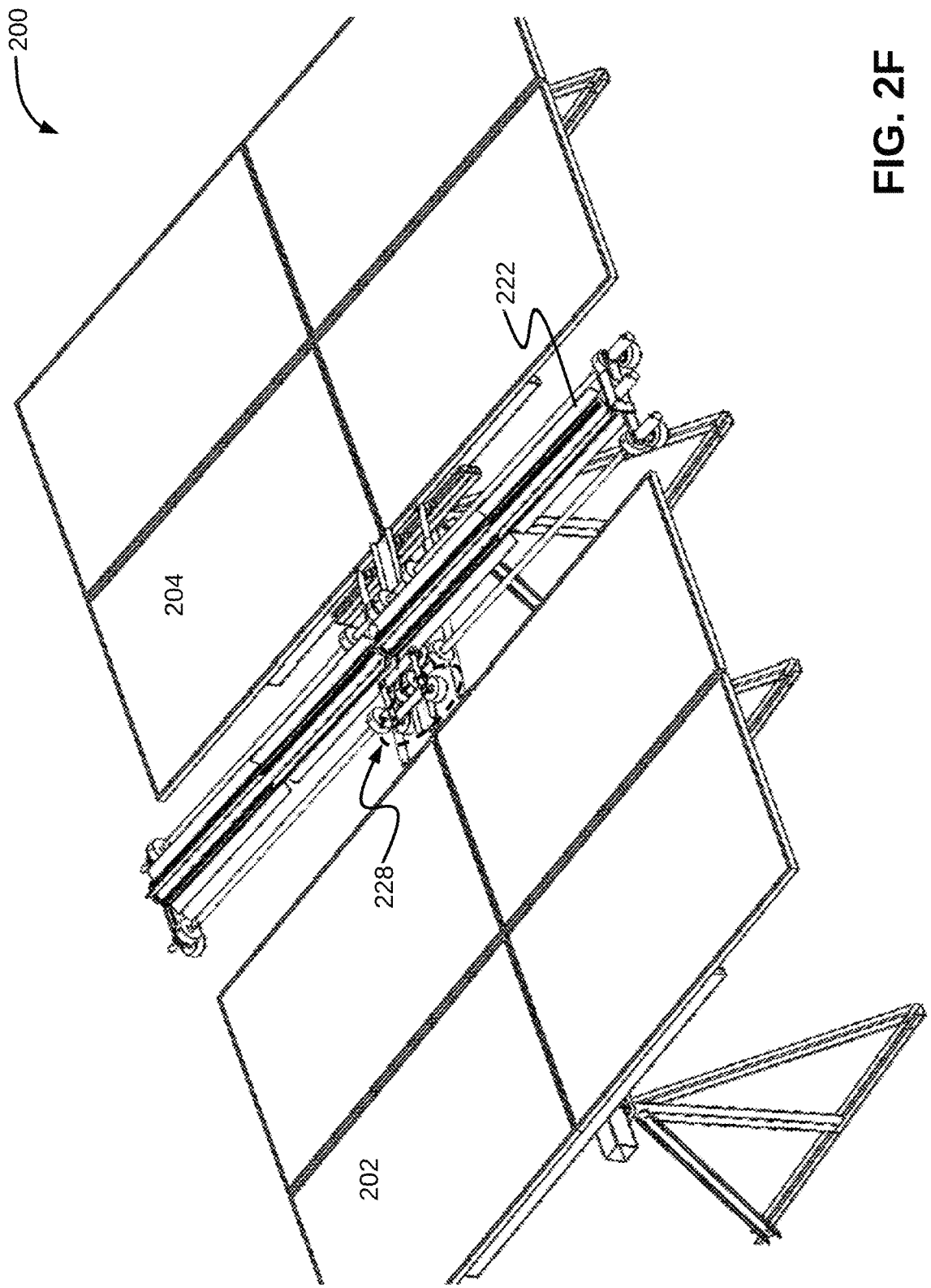
FIG. 2F illustrates a perspective view of the solar array with a robotic device, in accordance with another embodiment of the present disclosure.

Referring now to FIG. 2F, a perspective view of the solar array 200 with the robotic device 222 is illustrated, in accordance with another embodiment. In this embodiment, as shown in the FIG. 2F, the robotic device 222 may include an additional fourth set of wheels 228 for providing extra support and balance to the robotic device 222 when the robotic device 222 moves between the first solar panel table 202 and second solar panel table 204.

Figure 3:
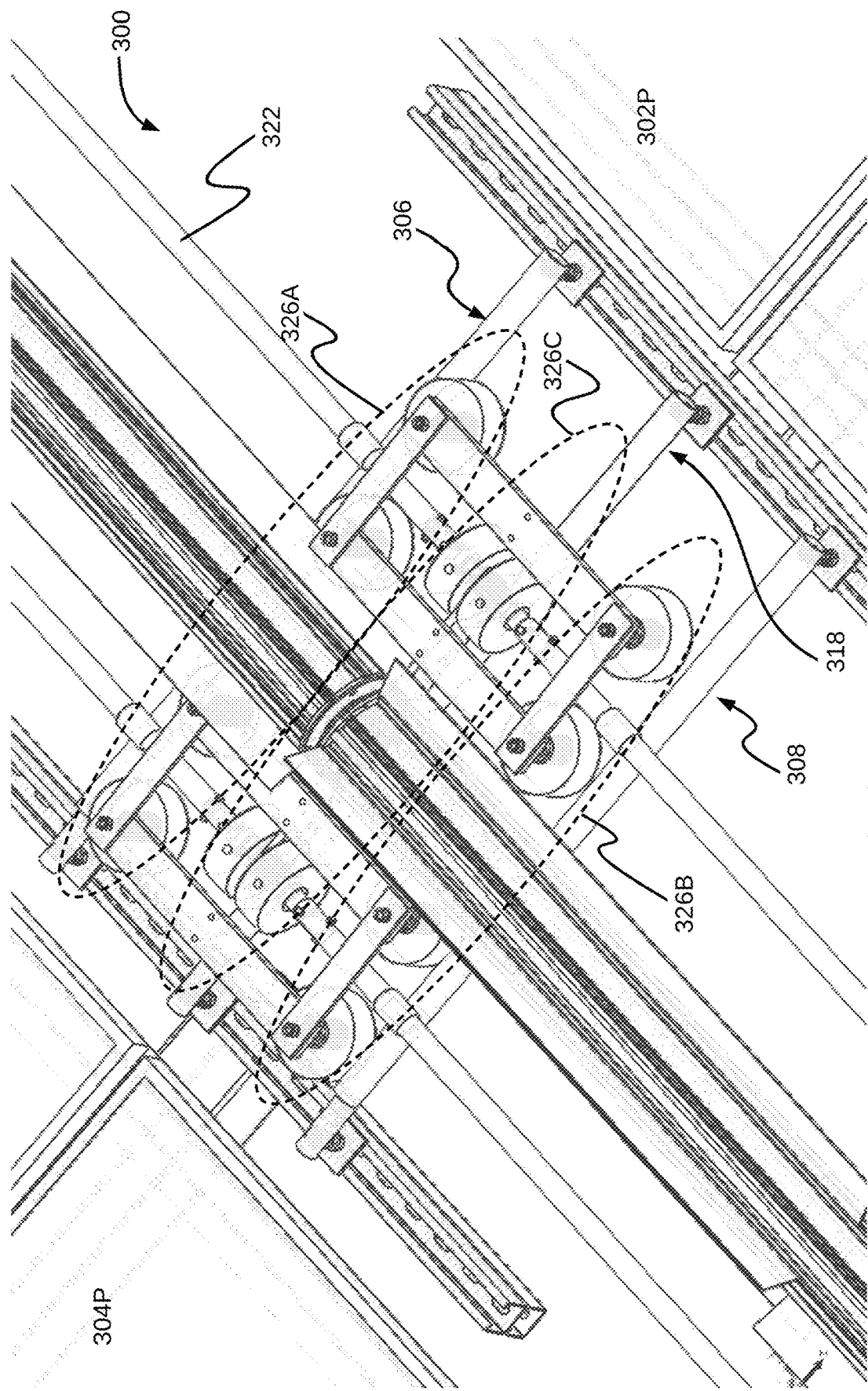
FIG. 3 illustrates a perspective view of a solar array with a robotic device is illustrated, in accordance with yet embodiment of the present disclosure.

Referring now to FIG. 3, a perspective view of a solar array 300 with a robotic device 322 is illustrated, in accordance with yet another embodiment of the present disclosure. As it can be seen in the FIG. 3, the solar array 300 includes a first solar panel table 302 having a first set of solar panels and defining a first plane 302P. The solar array 300 further includes a second solar panel table 304 having a second set of solar panels and defining a second plane 304P.

In order to bridge the first solar panel table 302 and the second solar panel table 304 and to allow a seamless movement of the robotic device 322 between the first solar panel table 302 and the second solar panel table 304, or more one telescopic guide assemblies may be used that run from an associated first position on an inner side of the first solar panel table 302 facing the second solar panel table 304 to an associated second position on an inner side of the second solar panel table 304 facing the first solar panel table 302. For example, as shown in FIG. 3, the solar array 300 may include first telescopic guide assembly 306, the second telescopic guide assembly 308, and the third telescopic guide assembly 318.

By way of an example, the robotic device 322 may include a set of left wheels 326A, a set of right wheels 326B, and a set of center wheels 326C. The set of left wheels 326A may engage with and travel on the first telescopic guide assembly 306. Further, the set of right wheels 326B may engage with and travel on the second telescopic guide assembly 308. Furthermore, the set of center wheels 326C may engage with and travel on the third telescopic guide assembly 318.

Unlike the third telescopic guide assembly 218, the third telescopic guide assembly 318 may not include a tray. Instead, the set of center wheels 326C may engage with and travel on the third telescopic guide assembly 318 (i.e. an outer tube of the third telescopic guide assembly 318).

In the above embodiments, a solar array and a telescopic guide assembly is disclosed. The telescopic guide assembly may be configured to establish a bridge between any two adjacent solar panel tables in the solar array, in spite of their lateral and angular misalignments. The telescopic guide assembly provides a low-cost and simple to manufacture and install solution, and therefore, allows usage of large number of bridges which will be needed for a utility scale solar array. Further, the telescopic guide assemblies are able to withstand various types of loadings caused by a robotic device translating across the gap between panels, including bending, torsion, lateral shear stress, etc. Furthermore, the telescopic guide assembly provides for a bridge which can smoothly, reliably, and effectively guide the robot from one solar panel table to another, with the largest possible range of misalignments, and at the largest possible range of tracker angles. Moreover, the bridge formed using the telescopic guide assemblies require no or little human observation or intervention during operation.

It is intended that the disclosure and examples be considered as exemplary only, with a true scope and spirit of disclosed embodiments being indicated by the following claims.

What is claimed is:

1. A solar array, comprising:
a first solar panel table comprising a first set of solar panels and defining a first plane;
a second solar panel table comprising a second set of solar panels and defining a second plane; and
at least one telescopic guide assembly bridging the first solar panel table and the second solar panel table to allow a seamless movement of a robotic device between the first solar panel table and the second solar panel table, wherein the at least one telescopic guide assembly runs from an associated first position on an inner side of the first solar panel table facing the second solar panel table to an associated second position on an inner side of the second solar panel table facing the first solar panel table, and wherein the at least one telescopic guide assembly comprises:
an inner pipe partially disposed within an outer pipe, wherein the inner pipe is configured to rotate within the outer pipe and is further configured to partially slide-in or slide-out of the outer pipe;
a first coupler configured to mechanically couple the inner pipe with the first solar panel table at the associated first position; and
a second coupler configured to mechanically couple the outer pipe with the second solar panel table at the associated second position.

2. The solar array of claim 1, wherein each of the first solar panel table and the second solar panel table is configured to rotate about one or more corresponding axes, and wherein the rotation of each of the first solar panel table and the second solar panel table is mutually independent of each other.

3. The solar array of claim 1, wherein each of the associated first position and the associated second position is at a pre-determined distance and in a pre-determined direction from a centre of the inner side of each of the first solar panel table and the second solar panel table, respectively.

4. The solar array of claim 1, wherein the at least one telescopic guide assembly is configured to be retrofitted between the first solar panel table and the second solar panel table.

5. The solar array of claim 1, wherein the at least one telescopic guide assembly is configured to support the weight and motion of the robotic device.

6. The solar array of claim 1, wherein the at least one telescopic guide assembly is mounted on top of the first solar panel table and the second solar panel table, or is in flush with the first solar panel table and the second solar panel table.

7. The solar array of claim 1, wherein each of the first coupler and the second coupler comprises:
a flexible joint configured to mechanically couple each of the inner pipe and the outer pipe, respectively, with a bracket mechanically attached to the first solar panel table and the second solar panel table, respectively, and wherein the flexible joint is configured to allow relative motion in any rational axes between respective pipe and respective bracket.

8. The solar array of claim 7, wherein the flexible joint is one of: a padded pivot pin, a ball joint, and a helm joint.

9. The solar array of claim 1, wherein the at least one telescopic guide assembly comprises:
two telescopic guide assemblies such that each of the two telescopic guide assemblies is equidistant from a centre of the inner side of each of the first solar panel table and the second solar panel table, respectively.

10. The solar array of claim 9, wherein the at least one telescopic guide assembly further comprises:
a central telescopic guide assembly bridging the first solar panel table and the second solar panel table, wherein the central telescopic guide assembly run from the centre on the inner side of the first solar panel table to the centre on the inner side of the second solar panel table.

11. The solar array of claim 10, wherein the at least one telescopic guide assembly further comprises:
a tray mounted on the outer pipe of the central telescopic guide assembly, wherein the tray is configured to receive one or more wheels of the robotic device as the robotic device travels between the first solar panel table and the second solar panel table.

* * * * *